(12) United States Patent
Takashima et al.

(10) Patent No.: US 7,579,729 B2
(45) Date of Patent: Aug. 25, 2009

(54) ROTARY ELECTRIC MACHINE

(75) Inventors: Kazuhisa Takashima, Tokyo (JP); Satoru Akutsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 398 days.

(21) Appl. No.: 11/466,573

(22) Filed: Aug. 23, 2006

(65) Prior Publication Data

US 2007/0205678 A1 Sep. 6, 2007

(30) Foreign Application Priority Data

Mar. 6, 2006 (JP) .................. P2006-058808

(51) Int. Cl.
H02K 3/50 (2006.01)
H02K 3/04 (2006.01)
H02K 15/04 (2006.01)

(52) U.S. Cl. .................. 310/71; 310/180
(58) Field of Classification Search .............. 310/71, 310/179–180, 184, 195
See application file for complete search history.

(56) References Cited

U.S. PATENT DOCUMENTS

| | | | | |
|---|---|---|---|---|
| 4,689,023 A * | 8/1987 | Strong et al. | ............. | 439/189 |
| 4,937,482 A * | 6/1990 | Dohogne | ............. | 310/71 |
| 5,770,902 A * | 6/1998 | Batten et al. | ............. | 310/71 |
| 5,828,147 A * | 10/1998 | Best et al. | ............. | 310/71 |
| 6,106,324 A * | 8/2000 | Kwapien et al. | ............. | 439/398 |
| 6,369,473 B1 * | 4/2002 | Baumeister et al. | ............. | 310/71 |
| 6,600,244 B2 * | 7/2003 | Okazaki et al. | ............. | 310/71 |
| 6,707,186 B2 * | 3/2004 | Oppitz | ............. | 310/71 |
| 6,914,356 B2 | 7/2005 | Yamamura et al. | | |
| 2003/0090166 A1 * | 5/2003 | Kobayashi et al. | ............. | 310/144 |
| 2004/0135457 A1 * | 7/2004 | Holzheu et al. | ............. | 310/179 |
| 2005/0088049 A1 * | 4/2005 | De Filippis et al. | ............. | 310/71 |
| 2005/0168089 A1 * | 8/2005 | Miyashita et al. | ............. | 310/156.57 |
| 2006/0097590 A1 * | 5/2006 | Schill | ............. | 310/71 |
| 2007/0296292 A1 * | 12/2007 | Kienzler et al. | ............. | 310/71 |

FOREIGN PATENT DOCUMENTS

JP P2003-324883 A 11/2003

* cited by examiner

*Primary Examiner*—Burton Mullins
(74) *Attorney, Agent, or Firm*—Sughrue Mion, PLLC

(57) ABSTRACT

A rotary electric machine comprising a stator body (ST in FIG. 1) which includes a winding configured of a plurality of coils (2), and a power supply section (PS) which includes conductive members (4, 5 and 6) for connecting the coils (2) to one another, and a holding member (11) for holding the conductive members (4, 5 and 6), wherein the power supply section (PS) is configured by employing the holding member (11) which is common to different connection structures such as a Y-connection and a delta connection. The rotary electric machine is advantageous in the points of the fabrication and supply of components owing to the common use of the components.

6 Claims, 9 Drawing Sheets

ROTARY ELECTRIC MACHINE

BACKGROUND OF THE INVENTION

1. Field of the Invention

This invention relates to a rotary electric machine, and more particularly to the stator structure of a rotary electric machine.

2. Description of the Related Art

As a prior-art device concerning the coil connection structure of the stator of a rotary electric machine, there has been disclosed a configuration which includes a holding member for electrically insulating a plurality of electrically conductive members (refer to, for example, Japanese Patent No. 3,613,262).

According to the patent, the holding member made of an insulating material has grooves of annular shape or the like for insulating the plurality of conductive members, and the conductive members are disposed in the groove portions of the holding member. Besides, the arm portions of the conductive members having coil connection terminals are inserted through a plurality of grooves which are provided in the holding member so as to extend in the radial direction thereof.

In the coil connection member configured as stated above, the conductive members and the holding member which correspond to a connection structure need to be employed. Therefore, in a case where the connection specifications of both a Y-connection and a delta connection have become necessary in the point of performance or fabrication, or by reason of a market demand or the like though the structures, constitutions etc. of rotary electric machines are equivalent, the conductive members and the holding members having different shapes are required for the Y-connection and the delta connection. This poses the problem that fabrication costs and metal mold costs increase due to the multikinds of conductive members and holding members.

SUMMARY OF THE INVENTION

This invention has been made in order to solve the above problem, and it has for its object to provide a rotary electric machine in which a power supply section can be configured using a common holding member, even for different connection structures, and which is advantageous in the points of the fabrication and supply of components owing to the common use of the components.

A rotary electric machine according to this invention comprises a stator body which includes a winding configured of a plurality of coils, and a power supply section which includes conductive members for connecting the coils to one another, and a holding member for holding the conductive members, wherein the power supply section is configured by employing the holding member which is common to different connection structures.

In this invention, the power supply section is configured by employing the holding member which is common to the different connection structures such as a Y-connection structure and a delta connection structure, so that the rotary electric machine is advantageous in the points of the fabrication and supply of components owing to the common use of the components.

DESCRIPTION OF THE PREFERRED EMBODIMENTS

Embodiment 1

Figure 1:
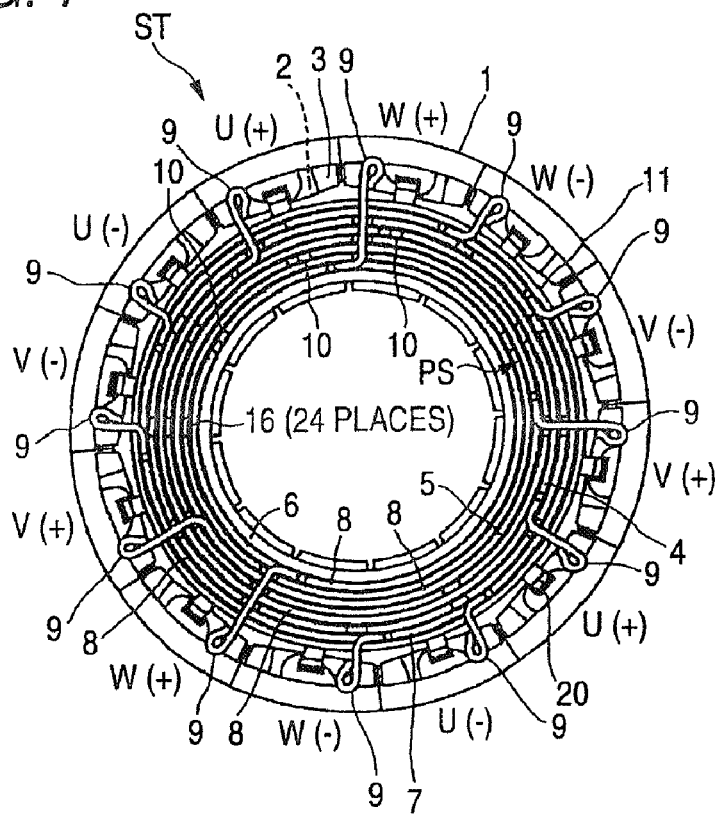
FIG. 1 is an end face view showing a state where the configuration of a stator in a Y-connection in Embodiment 1 according to this invention is seen in the axial direction thereof.
Figure 2:
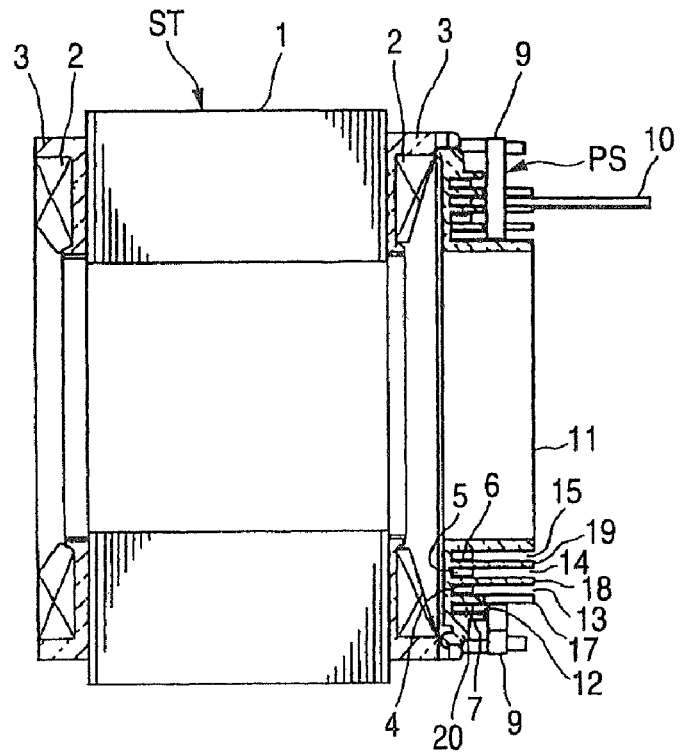
FIG. 2 is a vertical sectional view of the stator shown in FIG. 1.
Figure 3:
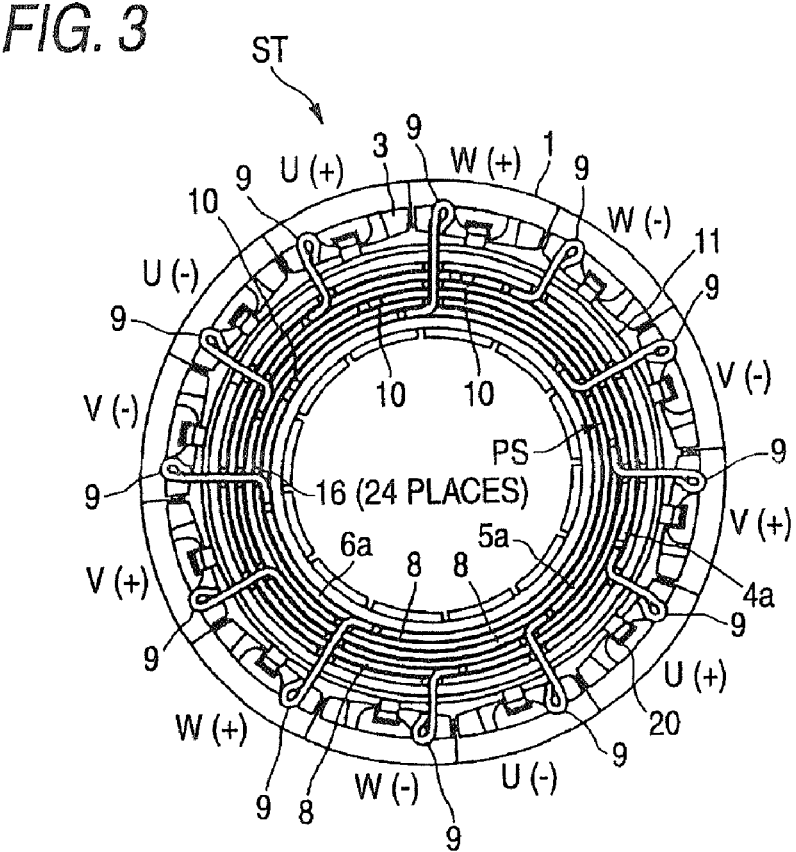
FIG. 3 is an end face view showing a state where the configuration of a stator in a delta connection in Embodiment 1 according to this invention is seen in the axial direction thereof.
Figure 4:
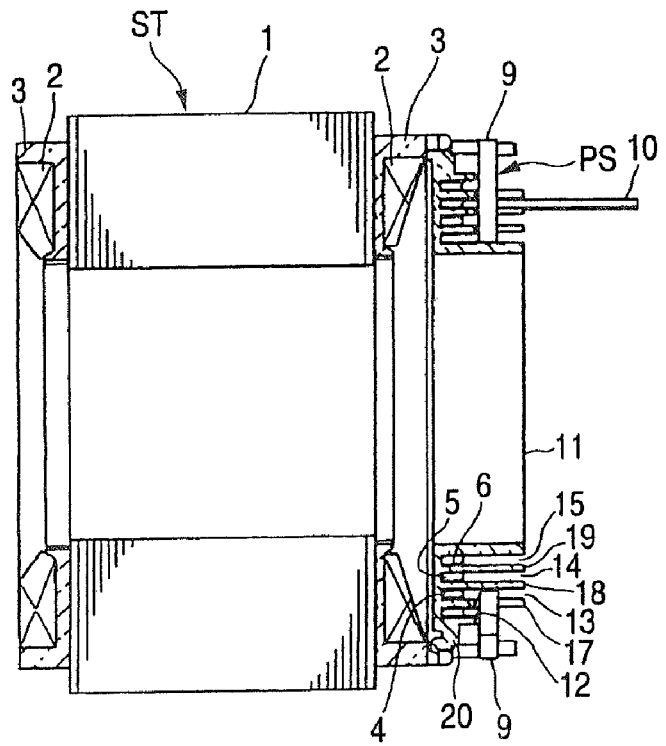
FIG. 4 is a vertical sectional view of the stator shown in FIG. 3.
Figure 5:
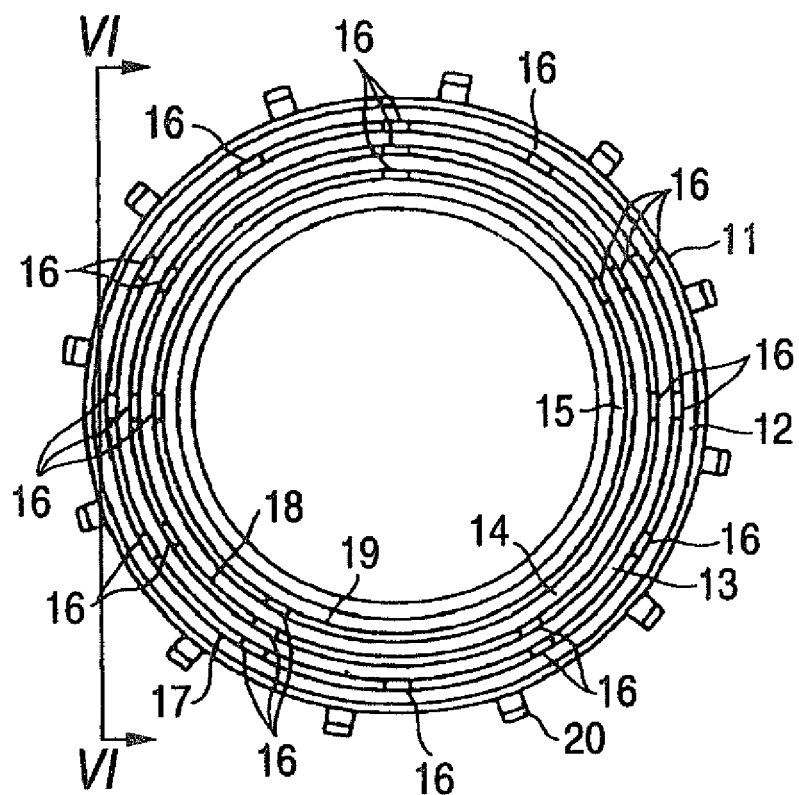
FIG. 5 is an end face view showing a state where the configuration of a simple holding member in Embodiment 1 according to this invention is seen in the axial direction thereof.
Figure 6:
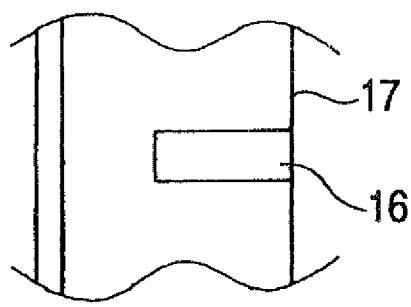
FIG. 6 is a partial sectional view taken along line VI-VI indicated in FIG. 5.
Figure 7:
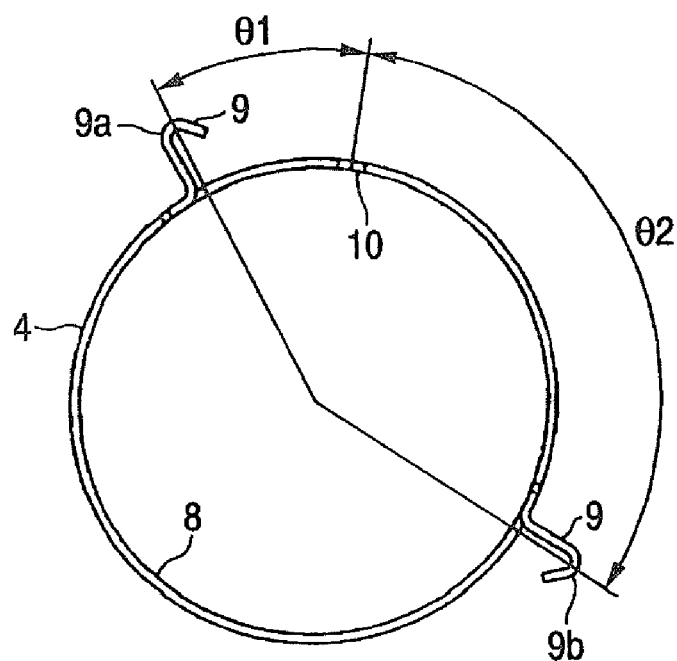
FIG. 7 is an end face view showing a state where the configuration of a conductive member of U-phase for the Y-connection in Embodiment 1 according to this invention is seen in the axial direction thereof.
Figure 8:
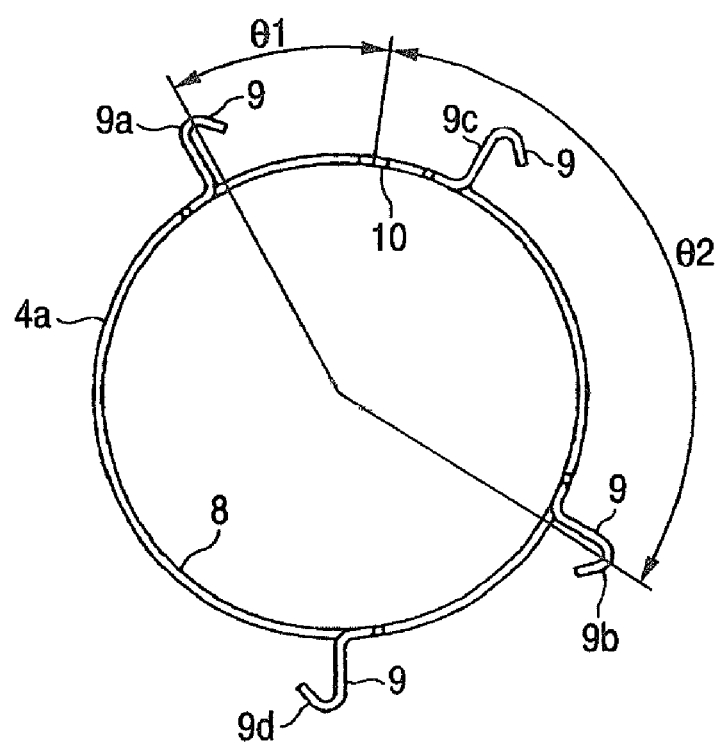
FIG. 8 is an end face view showing a state where the configuration of a conductive member of U-phase for the delta connection in Embodiment 1 according to this invention is seen in the axial direction thereof.
Figure 9:
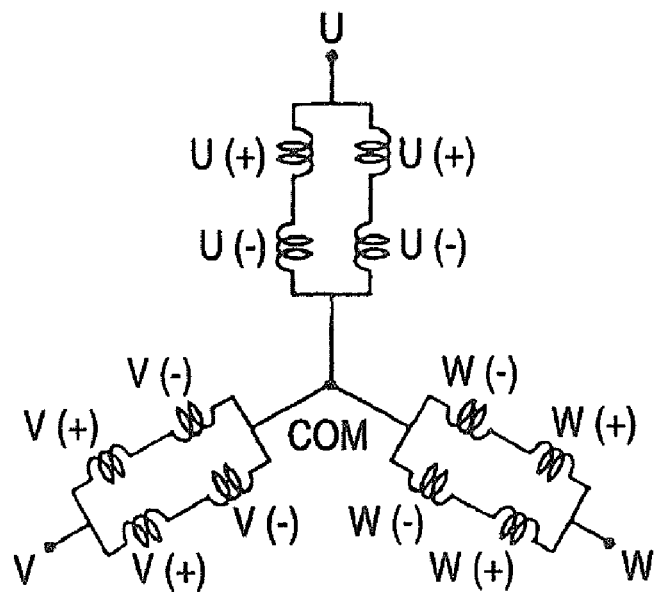
FIG. 9 is a connection diagram showing the connected state of the Y-connection in Embodiment 1 according to this invention.
Figure 10:
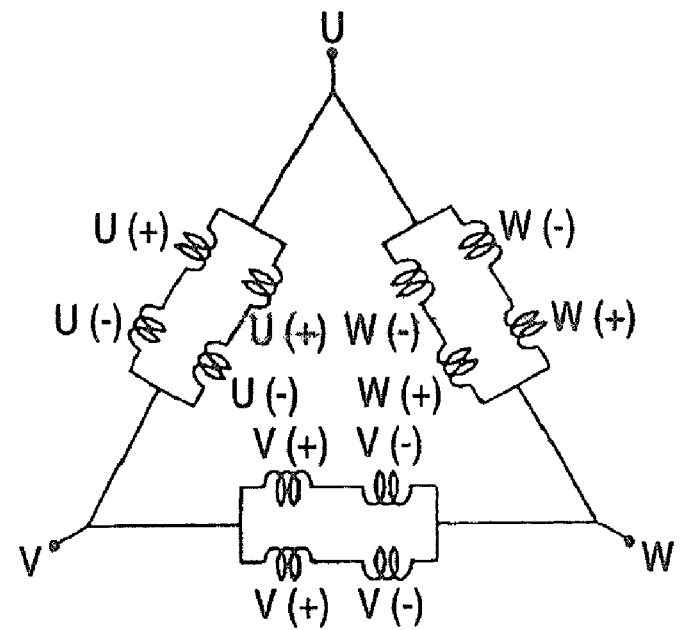
FIG. 10 is a connection diagram showing the connected state of the delta connection in Embodiment 1 according to this invention.

Embodiment 1 according to this invention will be described with reference to FIG. 1 through FIG. 10. Of these figures, FIG. 1 is an end face view showing a state where the configuration of a stator in a Y-connection in Embodiment 1 is seen in the axial direction thereof, FIG. 2 is a vertical sectional view of the stator shown in FIG. 1, FIG. 3 is an end face view showing a state where the configuration of a stator in a delta connection in Embodiment 1 is seen in the axial direction thereof, FIG. 4 is a vertical sectional view of the stator shown in FIG. 3, FIG. 5 is an end face view showing a state where the configuration of a simple holding member in Embodiment 1 is seen in the axial direction thereof, FIG. 6 is a partial sectional view taken along line VI-VI indicated in FIG. 5, FIG. 7 is an end face view showing a state where the configuration of a conductive member of U-phase for the Y-connection in Embodiment 1 is seen in the axial direction thereof, FIG. 8 is an end face view showing a state where the configuration of a conductive member of U-phase for the delta connection in Embodiment 1 is seen in the axial direction thereof, FIG. 9 is a connection diagram showing the connected state of the Y-connection in Embodiment 1, and FIG. 10 is a connection diagram showing the connected state of the delta connection in Embodiment 1.

Referring to FIG. 1-FIG. 8, the stators of rotary electric machines include an insulating member 3 which insulates a core 1 and a coil 2; conductive members 4, 5 and 6 for a U-phase, V-phase and W-phase for a Y-connection, respectively; conductive members 4a, 5a and 6a for a U-phase, V-phase and W-phase for a delta connection, respectively; a "COM" conductive member 7 which connects the coils 2 to the common connection point of the Y-connection; and a holding member 11 which insulates and holds the conductive members 4, 5 and 6 or the conductive members 4a, 5a and 6a.

With this structure, the coil 2 is wound in the core 1 to which the insulating member 3 is attached, and a plurality of such cores 1 are coupled, thereby to form a stator body ST.

On the other hand, the holding member 11 in which the conductive members 4, 5, 6 and 7 are assembled is held in engagement with the stator body ST, and the coils 2 are connected by the conductive members, thereby to configure a power supply section PS.

The conductive member 4 is configured of a cylindrical portion 8, arm portions 9 and an external connection terminal 10. The conductive members 4 of the same phases for the Y-connection and delta connection are in similar shapes in which only the numbers of the arm portions 9 being coil connecting terminals are different. Angles θ1 and θ2 from the external connection terminal 10 to the arm portions 9a and 9b in the conductive member 4 of the U-phase of the Y-connection are respectively equal to those in the conductive member 4 of the U-phase of the delta connection.

Incidentally, the above contents apply also to the respective conductive members 5 and 6 of the V-phases and W-phases. The holding member 11 includes concentric shared grooves 12-15 in which the connecting conductive members 4, 5 and 6 of different shapes are mountable, shared grooves 16 which are arranged in diametrical directions (in 24 places in the holding member in this embodiment), insulating walls 17-19 which serve to insulate the respective conductive members, and an engagement retention portion 20 which serves to retain the holding member 11 in engagement with the stator body ST.

Referring to FIGS. 1 and 2 which show the configuration of the stator in the Y-connection of 10 poles and 12 slots, coil units configured of the cores 1 to which the insulating members 3 are attached and in which the coils 2 are wound are twelve coil units U(+), U(−), V(−), V(+), W(+), W(−), U(−), U(+), V(+), V(−), W(−) and W(+) which are arrayed and disposed on an identical circumference and which constitute the stator body ST being cylindrical.

More specifically, the coil unit U(+) constituting the stator body ST is configured of the core 1 in which the coil 2 is wound so as to be electrically insulated by the insulating member 3. Also, each of the coil units U(−)-W(+) is configured of the core 1 in which the coil 2 is wound so as to be electrically insulated by the insulating member 3.

Besides, the holding member 11 which is made of an insulating material and in which the conductive members 4, 5 and 6 and the COM conductive member 7 are assembled is held in engagement with the end face of the cylindrical stator body ST, and it configures the power supply section PS which electrically connects the coils 2 respectively disposed in the coil units U(+)-V(+)-W(+), to one another by the conductive members 4, 5, 6 and 7.

When the U-phase of the Y-connection is taken as an example, the arm portions 9 which are the coil connection terminals of the conductive member 4 having the external connection terminal 10 are connected to the coils 2 of the coil units U(+) and U(+). Also in the V-phase and W-phase, the arm portions 9 which are the coil connection terminals of the conductive members 5 and 6 having the external connection terminals 10 are respectively connected to the coils 2 of the coil units V(+) and V(+) and the coil units W(+) and W(+). On the other hand, the coils 2 of the coil units U(−), V(−) and W(−) are connected to the arm portion 9 of the COM conductive member 7.

The holding member 11 includes the concentric shared grooves 12-15 in which the cylindrical portions 8 being the coil connection terminals of the conductive members 4, 5, 6 and 7 are mounted, the diametrical shared grooves 16 in which the arm portions 9 being the coil connection terminals of the conductive members 4, 5 and 6 are mounted, the insulating walls 17-19, and the engagement retention portion 20.

The configuration of the stator in the delta connection is shown in FIGS. 3 and 4. The basic configuration of the stator is the same as in the case of the Y-connection shown in FIGS. 1 and 2, and a configuration peculiar to the delta connection is included.

Besides, the holding member 11 which is made of the insulating material and in which the conductive members 4, 5 and 6 are assembled is retained in engagement with the end face of the cylindrical stator body ST, and it configures the power supply section PS which electrically connects the coils 2 respectively disposed in the coil units U(+)-V(+)-W(+), to one another by the conductive members 4, 5 and 6.

In FIG. 5, the holding member 11 is shown as a simple constituent. As explained before, the holding member 11 includes the concentric shared grooves 12-15 in which the cylindrical portions 8 being the coil connection terminals of the conductive members 4, 5 and 6 are mounted, the diametrical shared grooves 16 in which the arm portions 9 being the coil connection terminals of the conductive members 4, 5 and 6 are mounted, the insulating walls 17-19, and the engagement retention portion 20.

The insulating grooves 17-19 of the holding member 11 are provided with the diametrical shared grooves 16 as exemplified by an enlarged section in FIG. 6.

Shown in FIG. 7 is a state where the configuration of the conductive member 4 of the U-phase for use in the Y-connection is seen in the axial direction thereof.

The conductive member 4 is configured of the cylindrical portion 8, the two arm portions 9a and 9b being the coil connection terminals, and the external connection terminal 10.

The arm portions 9a and 9b being the coil connection terminals are formed in such a way that arm portions, which are integral with the cylindrical portion 8 made of a beltlike conductive piece and which are extended from the side end edges of the beltlike conductive pieces substantially in parallel with the lengthwise direction thereof, are bent in the plate thickness direction of the beltlike conductive piece forming the cylindrical portion 8, and the diametrical outer ends of the arm portions 9a and 9b as form coil connection ends are formed in the shape of hooks.

The angle between the arm portion 9a and the external connection terminal 10 is set as θ1, while the angle between the arm portion 9b and the external connection terminal 10 is set as θ2.

Shown in FIG. 8 is a state where the configuration of the conductive member 4a of the U-phase for use in the delta connection is seen in the axial direction thereof.

The conductive member 4a is configured of the cylindrical portion 8, four arm portions 9a, 9b, 9c and 9d being coil connection terminals, and the external connection terminal 10.

The angle between the arm portion 9a and the external connection terminal 10 is set as θ1, while the angle between the arm portion 9b and the external connection terminal 10 is set as θ2.

The number of the rotor poles of the rotary electric machine is 10 (not shown), and the number of the slots thereof is 12. The connected states of the Y-connection and the delta connection are respectively shown in FIG. 9 and FIG. 10. Two of the coils 2 are connected in series, and two such series connections are connected in parallel, whereby each of the phases (U-, V- and W-phases) is formed as a so-called "2-series and 2-parallel structure". The individual coils 2 in the stator body ST are arrayed as the coil units U(+), U(−), V(−), V(+), W(+), W(−), U(−), U(+), V(+), V(−), W(−) and W(+). Here, the coil units (+) and (−) of the identical phase are the coils which are connected in series and are wound in opposite directions, and which generate different polarities when energized. In this structure, each phase and the common connection point COM, the respective phases, and the parallel circuits are connected by conductive members, but each series connection which consists of the adjacent cores is made a continuous winding in the stator body ST.

In the stator configured as described above, the shared grooves 12-16 are provided in the holding member 11, so that both the conductive members 4, 5 and 6 and 4a, 5a and 6a for the Y-connection and the delta connection as have the different shapes can be assembled. Thus, even in a case where connections are different in rotary electric machines of identical structure and identical constitution, the rotary electric machines can be fabricated using the same holding member 11, and the fabrication cost and metal mold cost of the holding member 11 can be reduced. Besides, the conductive members 4, 5 and 6 and 4a, 5a and 6a of the same phases for the respective connections are in the similar shapes in which only the numbers of the arm portions 9 being the coil connecting terminals are different, so that they can be fabricated by the same metal molds, and the fabrication costs and the metal mold costs thereof can be reduced.

(1A) Embodiment 1 according to this invention consists in comprising a stator body ST which includes a winding configured of a plurality of coils 2, and a power supply section PS which includes conductive members 4, 5, 6 and 7 or 4a, 5a and 6a for connecting the coils 2 to one another, and a holding member 11 for holding the conductive members 4, 5, 6 and 7 or 4a, 5a and 6a, wherein the holding member 11 of the power supply section PS is common to different connection structures. It is therefore possible to configure the power supply section by employing the holding member which is common to the different connection structures, and to obtain a rotary electric machine which is advantageous in the points of the fabrication and supply of components owing to the common use of the components.

In other words, Embodiment 1 consists in a rotary electric machine having a stator body ST which is formed by winding coils 2 in cores 1 with insulating members 3 respectively attached thereto and coupling the plurality of cores 1, and a power supply section PS which includes conductive members 4, 5, 6 and 7 or 4a, 5a and 6a for connecting the coils 2 to one another, and a holding member 11 for holding the conductive members 4, 5, 6 and 7 or 4a, 5a and 6a, characterized in that the holding member 11 of the power supply section PS is common to different connection structures.

Accordingly, the power supply sections PS are configured by employing the same holding members 11 for a Y-connection and a delta connection, and the conductive members 4, 5 and 6, and 4a, 5a and 6a of the same phases for the respective connections are brought into similar shapes which differ in only the numbers of arm portions 9 and 9a that are coil connecting terminals. Thus, it is intended to reduce the fabrication costs and metal mold costs of the holding members 11 and the conductive members 4, 5 and 6, and 4a, 5a and 6a, and the following advantages are brought forth:

(1) Common use of the holding member 11

(2) Reduction in the fabrication cost of the holding member 11

(3) Reduction in the metal mold cost of the holding member 11

(4) Reductions in the fabrication costs of the conductive members 4, 5 and 6, and 4a, 5a and 6a

(5) Reductions in the metal mold costs of the conductive members 4, 5 and 6, and 4a, 5a and 6a

(1B) According to Embodiment 1 of this invention, in the configuration of the item (1A), the holding member 11 is provided with concentric shared grooves 12-15 in which the connecting conductive members 4, 5 and 6, and 4a, 5a and 6a having different shapes can be mounted, and shared grooves 16 which are arranged in the diametrical directions of the holding member 11. It is therefore possible to configure the power supply section PS by employing the common holding member 11 which is provided with the shared grooves 12-15 common to the different connection structures and the shared grooves 16 arranged in the diametrical directions, and to obtain a rotary electric machine which is advantageous in the points of the fabrication and supply of components owing to the common use of the components.

(1C) According to Embodiment 1 of this invention, the configuration of the item (1A) or the item (1B) is characterized in that the conductive members 4, 5 and 6, and 4a, 5a and 6a of the same phases for the respective connections are in similar shapes which differ in only the numbers of arm portions 9 that are coil connecting terminals. It is therefore possible to configure the power supply section PS by employing either of the conductive members 4, 5 and 6, and 4a, 5a and 6a of the same phases for the respective connections as are common to the different connection structures and as have the similar shapes which differ in only the numbers of the arm portions 9 that are coil connecting terminals, and to obtain a rotary electric machine which is advantageous in the points of the fabrication and supply of components owing to the common use of the components.

(1D) According to Embodiment 1 of this invention, the configuration of any of the items (1A)-(1C) is characterized in that connection contents which are configured as the connection structures are a Y-connection and a delta connection. It is therefore possible to configure the power supply section PS by employing the holding member 11 which is common to the different connection structures of the Y-connection and the delta connection, and to obtain a rotary electric machine which is advantageous in the points of the fabrication and supply of components owing to the common use of the components.

(1E) According to Embodiment 1 of this invention, the configuration of any of the items (1A)-(1D) is characterized in that the relationship between the number of poles and the number of slots is 10 poles and 12 slots. It is therefore possible to configure the power supply section PS by employing the holding member 11 which is common to the different connection structures, and to obtain a rotary electric machine of 10 poles and 12 slots as is advantageous in the points of the fabrication and supply of components owing to the common use of the components.

Embodiment 2

Figure 12:
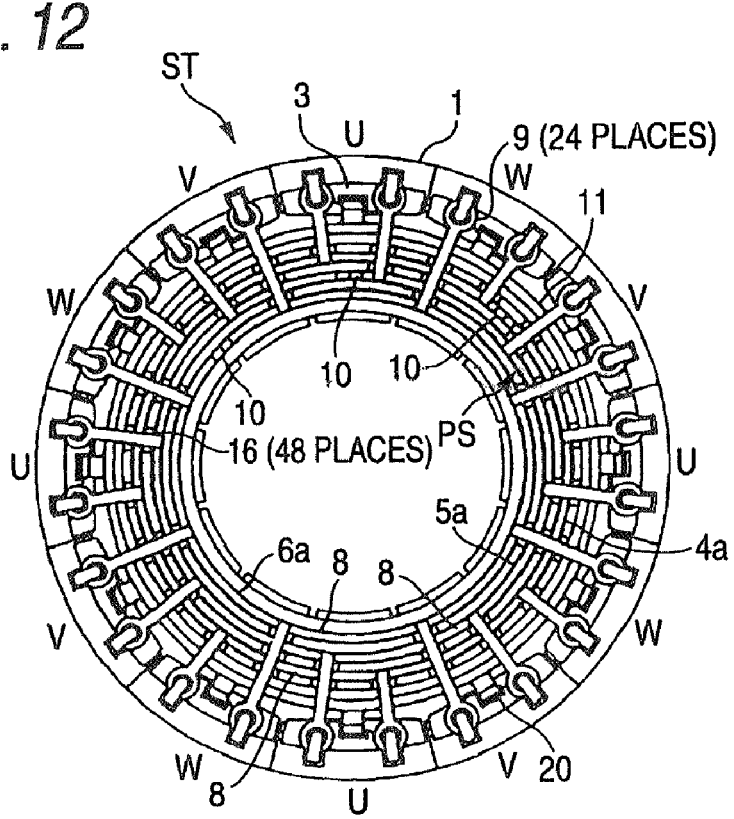
FIG. 12 is an end face view showing a state where the configuration of a stator in a delta connection in the case of 8 poles and 12 slots in Embodiment 2 according to this invention is seen in the axial direction thereof.
Figure 13:
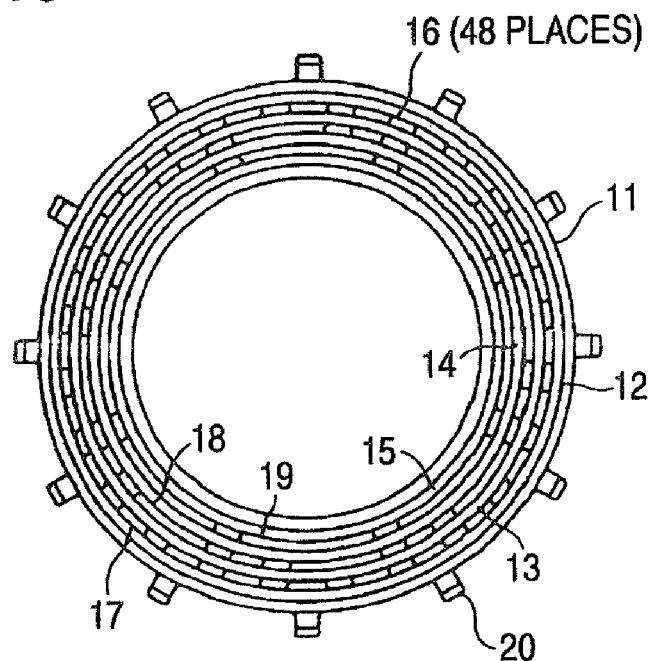
FIG. 13 is an end face view showing a state where the configuration of a simple holding member in Embodiment 2 according to this invention is seen in the axial direction thereof.
Figure 14:
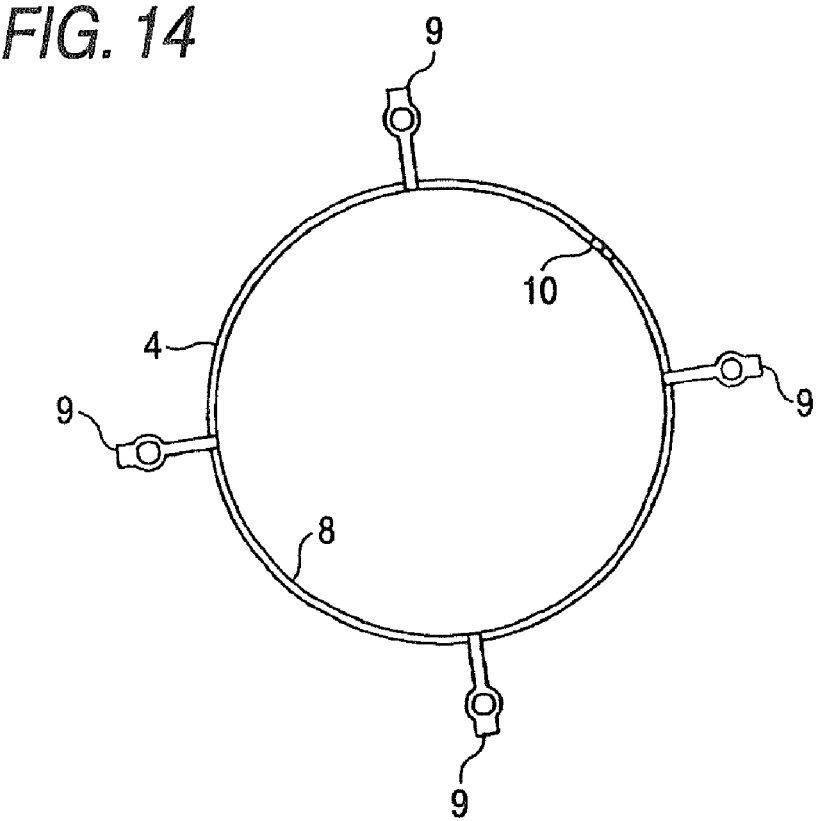
FIG. 14 is an end face view showing a state where the configuration of a conductive member of U-phase for the Y-connection in Embodiment 2 according to this invention is seen in the axial direction thereof.
Figure 15:
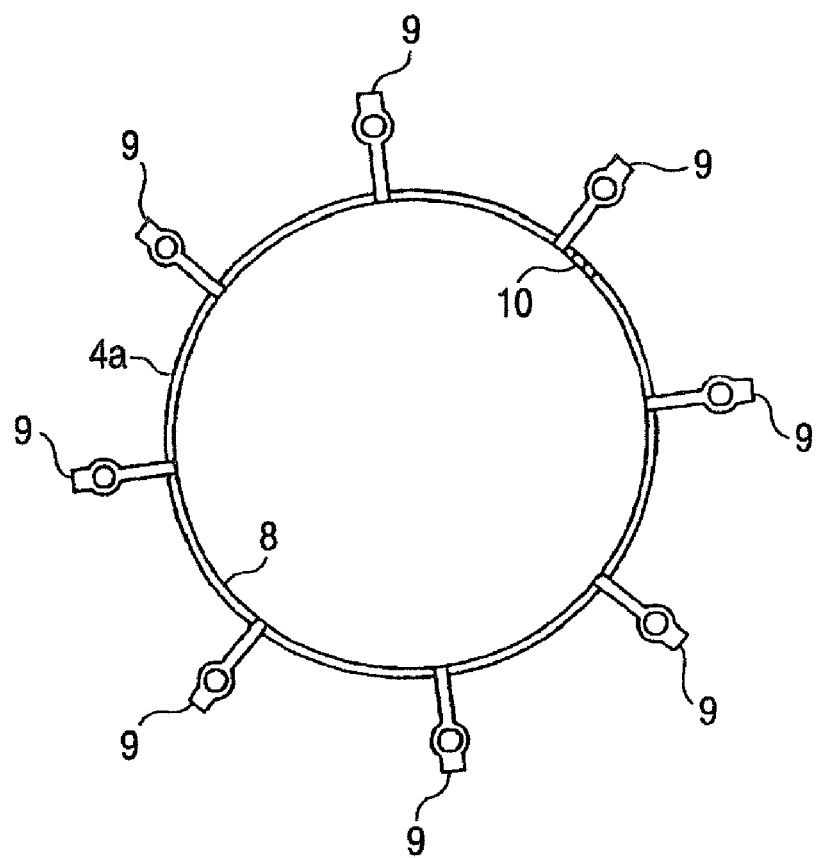
FIG. 15 is an end face view showing a state where the configuration of a conductive member of U-phase for the delta connection in Embodiment 2 according to this invention is seen in the axial direction thereof.
Figure 16:
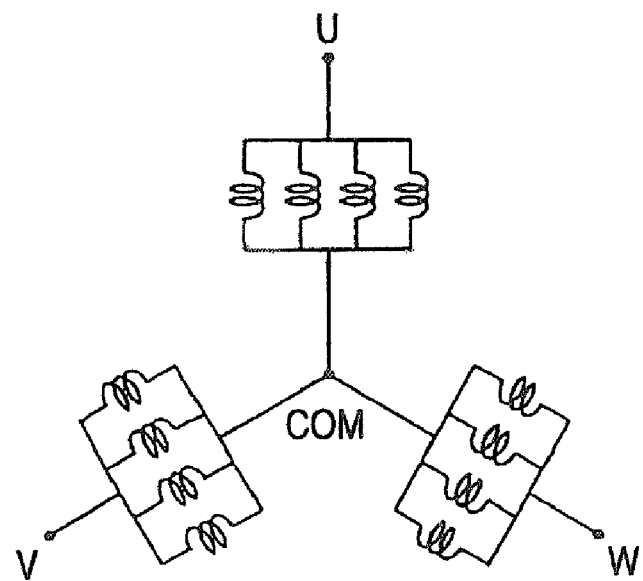
FIG. 16 is a connection diagram showing the connected state of the Y-connection in Embodiment 2 according to this invention.
Figure 17:
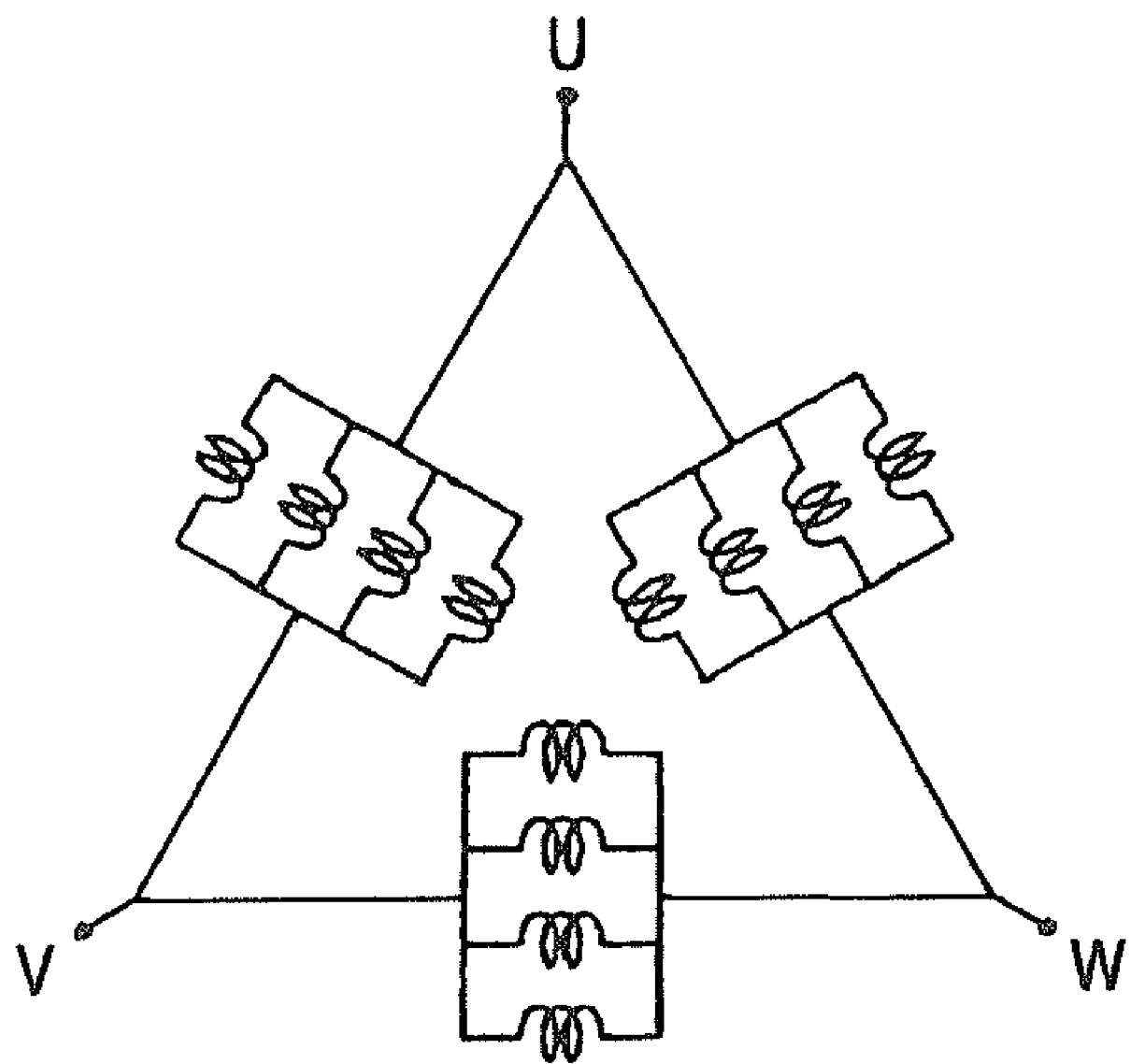
FIG. 17 is a connection diagram showing the connected state of the delta connection in Embodiment 2 according to this invention.

Embodiment 2 according to this invention will be described with reference to FIG. 11 through FIG. 17. Of these figures, FIG. 11 is an end face view showing a state where the configuration of a stator in a Y-connection in the case of 8 poles and 12 slots in Embodiment 2 is seen in the axial direction thereof, FIG. 12 is an end face view showing a state where the configuration of a stator in a delta connection in the case of 8 poles and 12 slots in Embodiment 2 is seen in the axial direction thereof, FIG. 13 is an end face view showing a state where the configuration of a simple holding member in Embodiment 2 is seen in the axial direction thereof, FIG. 14 is an end face view showing a state where the configuration of a conductive member of U-phase for the Y-connection in Embodiment 2 is seen in the axial direction thereof, FIG. 15 is an end face view showing a state where the configuration of a conductive member of U-phase for the delta connection in Embodiment 2 is seen in the axial direction thereof, FIG. 16 is a connection diagram showing the connected state of the Y-connection in Embodiment 2, and FIG. 17 is a connection diagram showing the connected state of the delta connection in Embodiment 2.

In Embodiment 2, a configuration except a peculiar configuration to be described here has the same configurational contents as in Embodiment 1 described before, and it achieves similar functions. Throughout the figures, the same reference numerals and signs indicate identical or equivalent parts.

Figure 11:
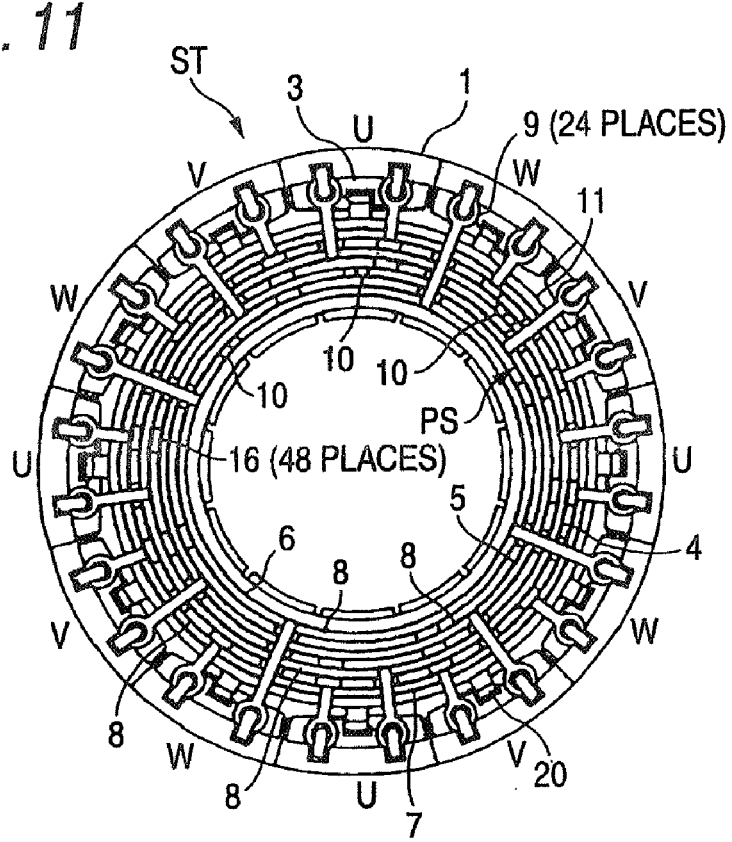
FIG. 11 is an end face view showing a state where the configuration of a stator in a Y-connection in the case of 8 poles and 12 slots in Embodiment 2 according to this invention is seen in the axial direction thereof.

Referring to FIG. 11 which shows the configuration of a stator in a Y-connection of 8 poles and 12 slots, coil units configured of cores 1 to which insulating members 3 are attached and in which coils 2 are wound are twelve coil units U, V, W, U, V, W, U, V, W, U, V and W which are arrayed and disposed on an identical circumference and which constitute a stator body ST being cylindrical. Four parallel ones of the coils 2 form one phase. The individual coils 2 are arrayed in the sequence of the phases U, V and W within the stator body ST, and such arrays exist in four sets.

More specifically, the coil unit U constituting the stator body ST is configured of the core 1 in which the coil 2 is wound so as to be electrically insulated by the insulating member 3. Also, each of the other coil units V, W, U, V, W, U, V, W, U, V and W is configured of the core 1 in which the coil 2 is wound so as to be electrically insulated by the insulating member 3.

Besides, a holding member 11 which is made of an insulating material and in which conductive members 4, 5 and 6 and a "COM" conductive member 7 are assembled is retained in engagement with the end face of the cylindrical stator body ST, and it configures a power supply section PS which electrically connects the coils 2 respectively disposed in the coil units U, V, W, U, V, W, U, V, W, U, V and W, to one another by the conductive members 4, 5, 6 and 7.

When the U-phase of the Y-connection is taken as an example, arm portions 9 which are the coil connection terminals of the conductive member 4 having an external connection terminal 10 are connected to the coils 2 of the coil units U. Also in the V-phase and W-phase, arm portions 9 which are the coil connection terminals of the conductive members 5 and 6 having external connection terminals 10 are respectively connected to the coils 2 of the coil units V and W.

The holding member 11 includes concentric shared grooves in which cylindrical portions 8 being the coil connection terminals of the conductive members 4, 5, 6 and 7 are mounted, diametrical shared grooves in which the arm portions 9 being the coil connection terminals of the conductive members 4, 5 and 6 are mounted, insulating walls, and an engagement retention portion 20.

Shown in FIG. 12 is the configuration of a stator in a delta connection of 8 poles and 12 slots. The basic configuration of the stator is the same as in the case of the Y-connection shown in FIG. 11, and a configuration peculiar to the delta connection is included.

Besides, a holding member 11 which is made of an insulating material and in which conductive members 4a, 5a and 6a are assembled is retained in engagement with the end face of a cylindrical stator body ST, and it configures a power supply section PS which electrically connects coils 2 respectively disposed in coil units U, V and W, to one another by the conductive members 4a, 5a and 6a.

In FIG. 13, the holding member 11 is shown as a simple constituent. As explained before, the holding member 11 includes the concentric shared grooves 12-15 in which the cylindrical portions 8 being the coil connection terminals of the conductive members 4, 5 and 6 are mounted, the diametrical shared grooves 16 in which the arm portions 9 being the coil connection terminals of the conductive members 4, 5 and 6 are mounted, the insulating walls 17-19, and the engagement retention portion 20.

Shown in FIG. 14 is a state where the configuration of the conductive member 4 of the U-phase for the Y-connection is seen in the axial direction thereof.

The conductive member 4 is configured of the cylindrical portion 8, the four arm portions 9 being the coil connection terminals, and the external connection terminal 10.

The arm portions 9 being the coil connection terminals are extended in the diametrical directions of the cylindrical portion 8 from this cylindrical portion 8 made of a beltlike conductive piece, and the diametrically outer end of each of the arm portions 9 as forms a coil connection end is formed in the shape of an annulus having a protrusion.

Shown in FIG. 15 is a state where the configuration of the conductive member 4a of the U-phase for the delta connection is seen in the axial direction thereof.

The conductive member 4a is configured of a cylindrical portion 8, arm portions 9 totaling eight as are coil connection terminals, and an external connection terminal 10.

The arm portions 9 being the coil connection terminals are extended in the diametrical directions of the cylindrical portion 8 from this cylindrical portion 8 made of a beltlike conductive piece, and the diametrically outer end of each of the arm portions 9 as forms a coil connection end is formed in the shape of an annulus having a protrusion.

FIG. 16 shows the connected state of the Y-connection, while FIG. 17 shows the connected state of the delta connection. Four parallel ones of the coils form one phase.

Also with the stator configured as described above, the holding member 11 is provided with the shared grooves. It is therefore permitted to assemble both the conductive members for the Y-connection and the delta connection having the different shapes. Moreover, the conductive members of the same phases for the respective connections are in similar shapes which differ in only the numbers of the coil connecting terminals. Therefore, Embodiment 2 brings forth the same advantages as those of Embodiment 1.

Incidentally, although the case of 8 poles and 12 slots has been described in this embodiment, a similar configuration is possible as long as the relationship between the number of poles and the number of slots is integral times of 2 poles and 3 slots (for example, 4 poles and 6 slots, or 6 poles and 9 slots).

(2A) According to Embodiment 2 of this invention, the configuration of any of the items (1A)-(1D) in Embodiment 1 is characterized in that the relationship between the number of poles and the number of slots is integral times of 2 poles and 3 slots, such as 4 poles and 6 slots, or 6 poles and 9 slots. It is therefore possible to configure the power supply section by employing the holding member which is common to the different connection structures, and to obtain a rotary electric machine in which the relationship between the number of poles and the number of slots is the integral times of 2 poles and 3 slots and which is advantageous in the points of the fabrication and supply of components owing to the common use of the components.

What is claimed is:

1. A rotary electric machine comprising:
   a stator body which includes a winding configured of a plurality of coils; and
   a power supply section which includes conductive members for connecting the plurality of the coils to one another, and a holding member for holding the conductive members,
   wherein the holding member is configured to hold the conductive members having different connection structures, and the holding member holds the conductive members having one of the different connection structures,
   wherein said holding member is provided with concentric grooves, and diametrical grooves which are arranged in diametrical directions of said holding member,
   wherein said concentric grooves and said diametrical grooves are configured to hold the conductive members having the different connection structures, and the concentric grooves and the diametrical grooves hold the conductive members having the one of the different connection structures,
   wherein said different connection structures are different shapes.

2. A rotary electric machine as defined in claim 1, wherein the conductive members having the different connection structures and having same phases for their respective connections are configured in a shape which differs only in a number of coil connecting terminals of the respective conductive members.

3. A rotary electric machine as defined in claim 1, wherein the connection structures configure the coils in a Y-connection and a delta connection.

4. A rotary electric machine as defined in claim 1, wherein a relationship between the number of rotor poles and the number of stator poles is 10 rotor poles and 12 stator poles.

5. A rotary electric machine as defined in claim 1, wherein a relationship between the number of poles and the number of slots is an integral times of 2 rotor poles and 3 stator slots.

6. The rotary electric machine as set forth in claim 1, wherein the conductive members have the different shapes in an axial direction with respect to the stator body.

* * * * *